(12) United States Patent
Liu et al.

(10) Patent No.: US 11,159,607 B2
(45) Date of Patent: Oct. 26, 2021

(54) MANAGEMENT FOR A LOAD BALANCER CLUSTER

(71) Applicant: International Business Machines Corporation, Armonk, NY (US)

(72) Inventors: Qi Ming Liu, Wuxi (CN); Jian Hua Xia, Shanghai (CN); Yuan Yuan Zhang, Shanghai (CN); Guo Chun Bian, Wuxi (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/807,195

(22) Filed: Mar. 3, 2020

(65) Prior Publication Data

US 2021/0281637 A1 Sep. 9, 2021

(51) Int. Cl.
*G06F 13/00* (2006.01)
*H04L 29/08* (2006.01)
*H04L 12/741* (2013.01)

(52) U.S. Cl.
CPC ........ *H04L 67/1006* (2013.01); *H04L 45/745* (2013.01); *H04L 67/1034* (2013.01)

(58) Field of Classification Search
CPC ................. H04L 67/1006; H04L 67/1034; H04L 45/745
USPC ........ 709/226, 223, 229, 203, 245; 718/105, 718/102–104
See application file for complete search history.

(56) References Cited

U.S. PATENT DOCUMENTS

| | | | | |
|---|---|---|---|---|
| 8,553,537 B2 * | 10/2013 | Chao | ...................... | H04L 12/66 370/229 |
| 9,054,943 B2 * | 6/2015 | Yengalasetti | ....... | H04W 80/045 |
| 9,088,501 B2 | 7/2015 | Chaudhary | | |
| 9,467,506 B2 * | 10/2016 | Kontothanassis | ... | H04L 67/1002 |
| 2010/0265824 A1 * | 10/2010 | Chao | ...................... | H04L 12/66 370/235 |
| 2011/0153827 A1 * | 6/2011 | Yengalasetti | ......... | G06F 9/5044 709/226 |

(Continued)

FOREIGN PATENT DOCUMENTS

CN 105282191 A 1/2016

OTHER PUBLICATIONS

Sufiev et al., "Dynamic SDN Controller Load Balancing", MDPI, Future Internet 2019, Published: Mar. 21, 2019, 21 pages, <http://www.mdpi.com/journal/futureinternet>.

(Continued)

*Primary Examiner* — Kenneth R Coulter
(74) *Attorney, Agent, or Firm* — Randy E. Tajpda (57) ABSTRACT

In an approach to managing a load balancer cluster, one or more computer processors receive a packet comprising a source IP address of the packet. The one or more computer processors determine whether there is a record comprising the source IP address of the packet either in the load balancer or in the assistant. The one or more computer processors, responsive to determining there is no such record in the load balancer and there is the record in the assistant, obtain the record from the assistant, the record also comprising information of a first server in a server cluster and the first server being referred to as a destination server for any packet from the source IP address. The one or more computer processors send the packet to the first server.

16 Claims, 6 Drawing Sheets

(56) References Cited

U.S. PATENT DOCUMENTS

2015/0215388 A1* 7/2015 Kontothanassis ... H04L 67/1008
709/226
2018/0069785 A1* 3/2018 Chan ................... H04L 61/2007

OTHER PUBLICATIONS

Disclosed Anonymously et al., "Efficient TURN Load balancer for audio/video streams", An IP.com Prior Art Database Technical Disclosure, IP.com No. IPCOM000212798D, IP.com Electronic Publication Date: Nov. 28, 2011, 7 pages.
Mell et al., "The NIST Definition of Cloud Computing", Recommendations of the National Institute of Standards and Technology, NIST Special Publication 800-145, Sep. 2011, 7 pages.
"Elastic Load Balancing interface for AWS", Printed Jan. 24, 2020, 8 pages.

* cited by examiner

MANAGEMENT FOR A LOAD BALANCER CLUSTER

BACKGROUND

The present invention relates generally to the field of load balancers, and more particularly to managing a load balancer cluster.

A load balancer is a device that acts as a traffic reverse proxy and distributes network or application traffic across a number of application servers. Load balancers are used to increase capacity and reliability of applications for concurrent users. Load balancers can be aggregated where multiple load balancers work in tandem forming a load balancer cluster. A load balancing cluster can be used to, redundantly, balance application traffic across a number of application servers.

SUMMARY

Aspects of the present invention disclose a method, a computer program product, and a load balancer for managing a load balancer cluster. In an aspect, a method implemented by a load balancer in a load balancer cluster is disclosed, the load balancer cluster comprising a plurality of load balancers and an assistant. According to the method, a packet comprising a source IP address of the packet is received by the load balancer. Then whether there is a record comprising the source IP address of the packet either in the load balancer or in the assistant is determined by the load balancer. In response to determining there is no such record in the load balancer and there is the record in the assistant, the record from the assistant is obtained by the load balancer first, the record also comprising information of a first server in a server cluster and the first server being referred to as a destination server for any packet from the source IP address, and then the packet is sent to the first server by the load balancer.

In another aspect, a load balancer in a load balancer cluster is disclosed, the load balancer cluster comprising a plurality of load balancers and an assistant. The load balancer may include a computer processor coupled to a computer-readable memory unit, said memory unit comprising instructions that when executed by the computer processor implements the above method.

In yet another aspect, a computer program product used in a load balancer in a load balancer cluster is disclosed, the load balancer cluster comprising a plurality of load balancers and an assistant. The computer program product comprises a computer readable storage medium having program instructions embodied therewith. When executed on one or more load balancers, the instructions may cause the one or more load balancers to perform the above method.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
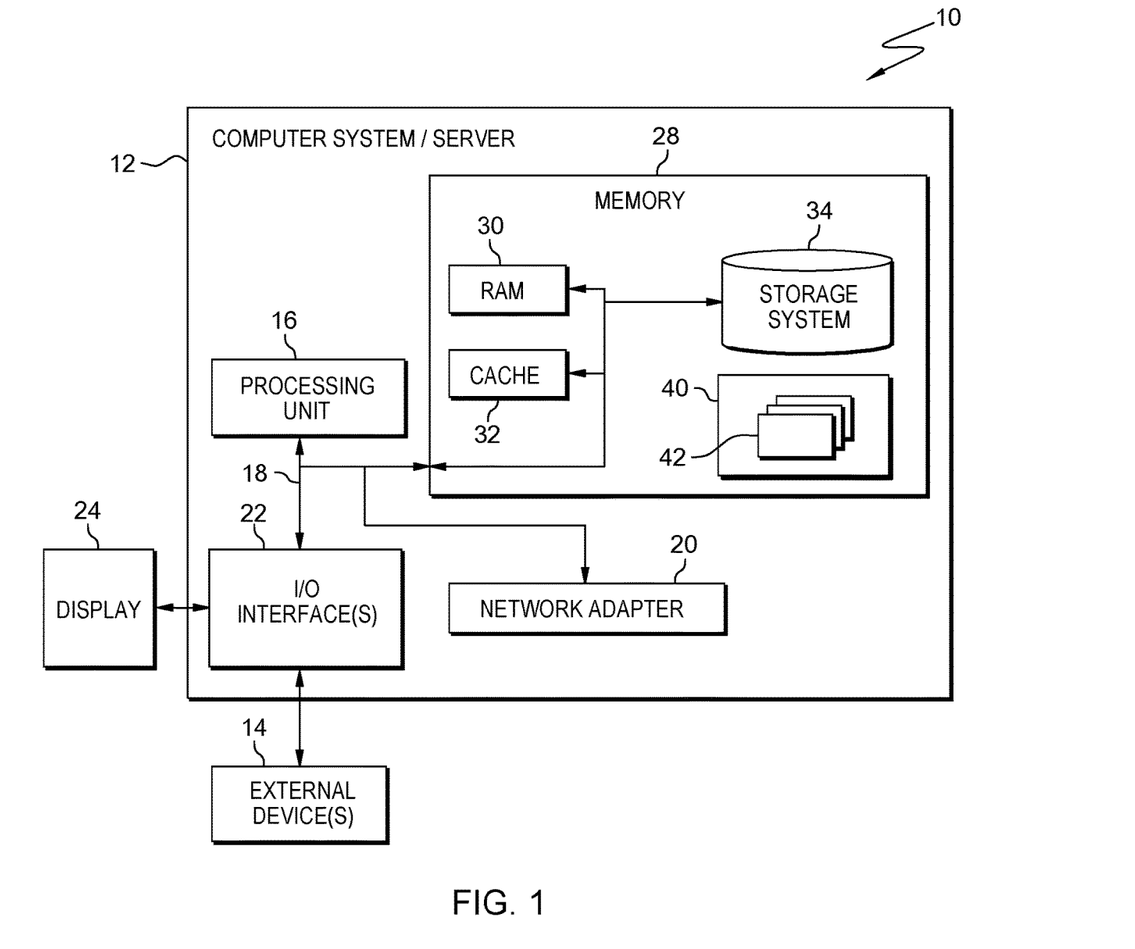
FIG. 1 depicts a cloud computing node according to some embodiments of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
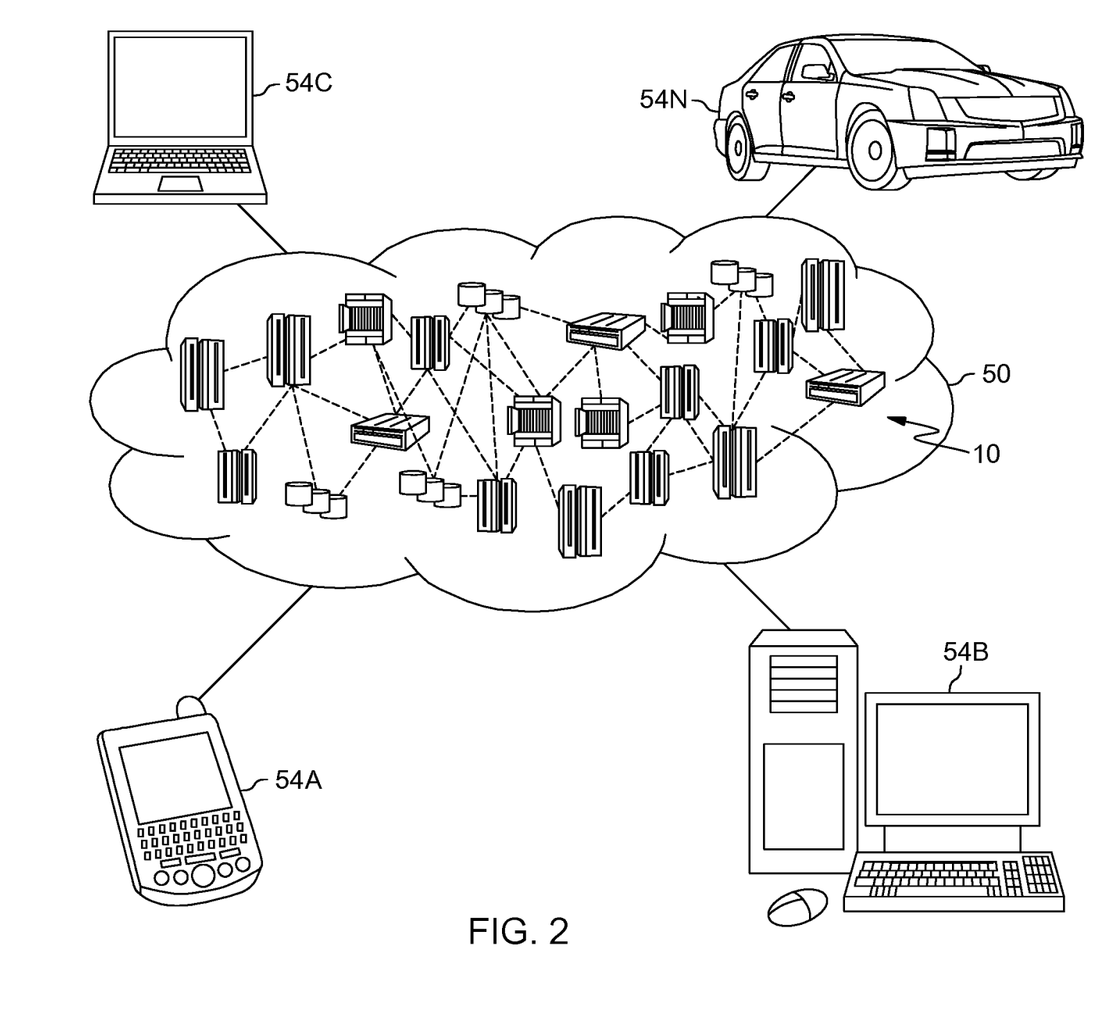
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
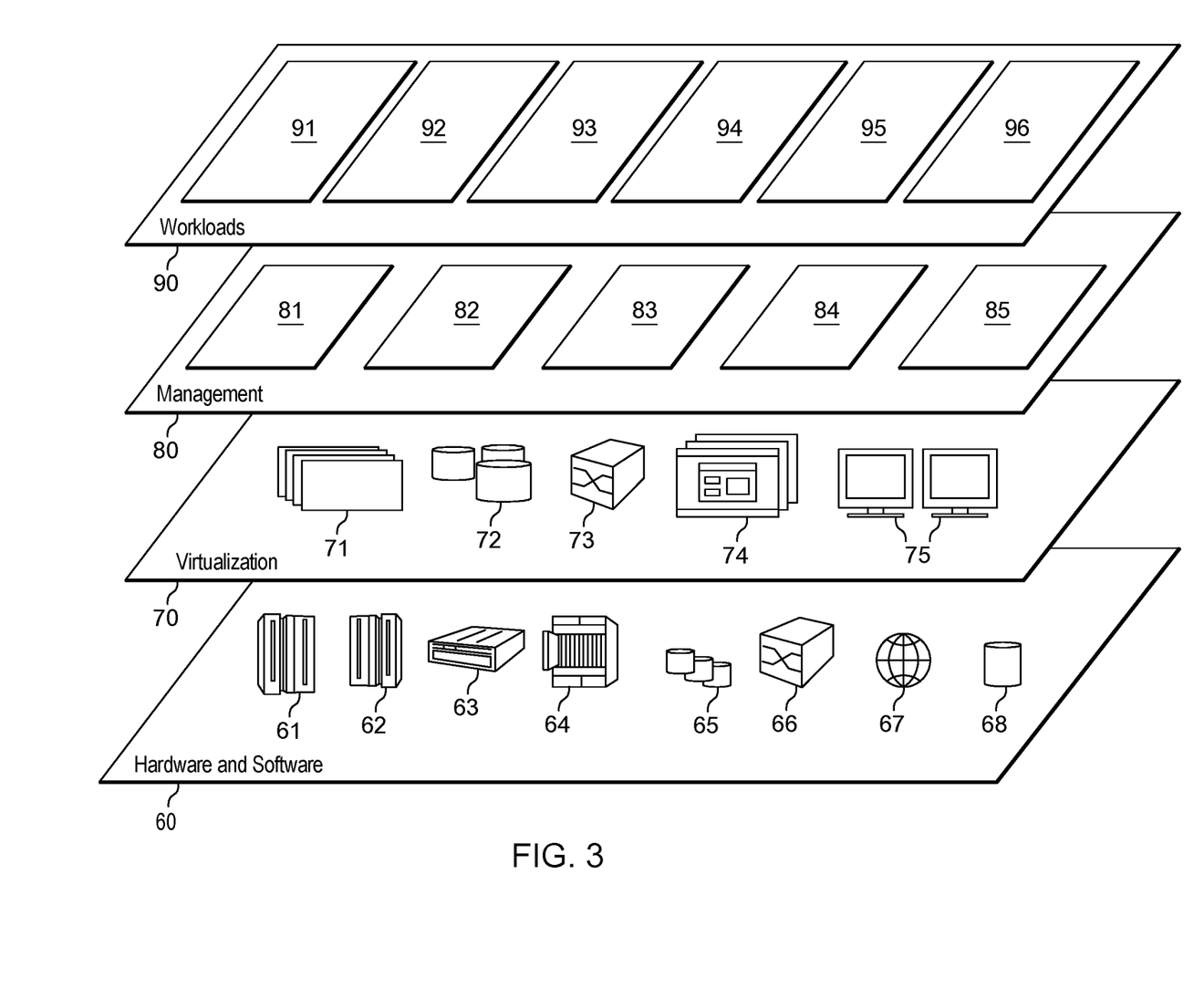
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and load balancer cluster management 96.

The present invention may contain various accessible data sources that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Load balancer cluster management 96 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Load balancer cluster management 96 enables the authorized and secure processing of user information, such as tracking information, as well as personal data, such as personally identifying information or sensitive personal information. Load balancer cluster management 96 provides information regarding the personal data and the nature (e.g., type, scope, purpose, duration, etc.) of the processing. Load balancer cluster management 96 provides the user with copies of stored personal data. Load balancer cluster management 96 allows the correction or completion of incorrect or incomplete personal data. Load balancer cluster management 96 allows the immediate deletion of personal data.

Figure 4:
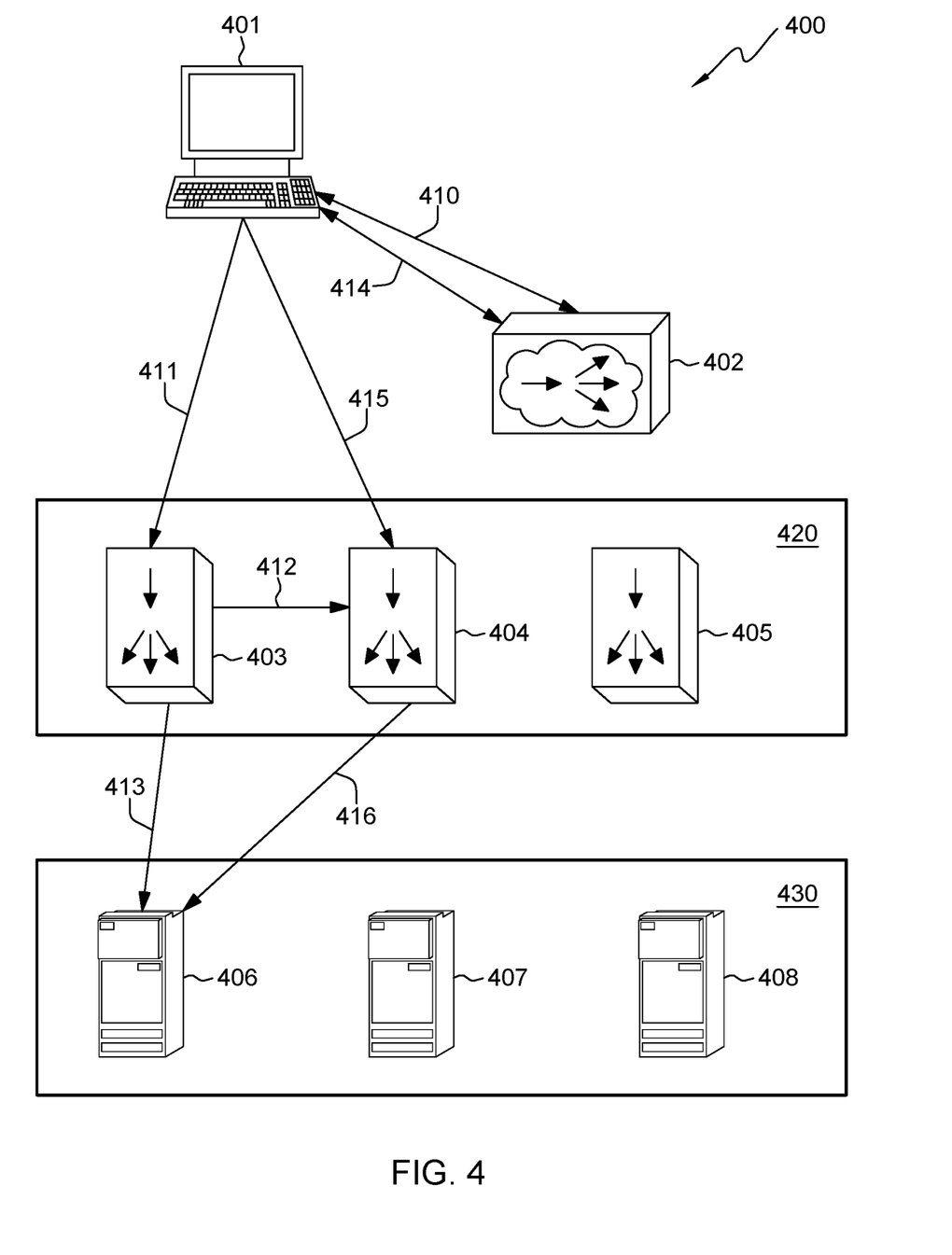
FIG. 4 depicts an exemplary existing load balancer cluster usage environment.

Referring to FIG. 4, an exemplary existing load balancer cluster usage environment 400 is depicted. The load balancer cluster usage environment 400 may include a client 401, a Domain Name System (DNS) 402, a load balancer cluster 420 and a server cluster 430. All components are connected directly or indirectly via a communication network. The load balancer cluster 420 may include a plurality of load balancers 403, 404, 405, of which only three are shown for illustrative brevity. The server cluster 430 may include a plurality of server 406, 407, 408, of which only three are shown for illustrative brevity.

The communication network may include various types of communication networks, such as a wide area network (WAN), local area network (LAN), a telecommunication network, a wireless network, a public switched network and/or a satellite network. The communication network may include connections, such as wire, wireless communication links, or fiber optic cables. It may be appreciated that FIG. 4 provides only an illustration of one implementation and does not imply any limitations with regard to the environments in which different embodiments may be implemented. Many modifications to the depicted environments may be made based on design and implementation requirements.

The client 401 may be, for example, a mobile device, a telephone, a personal digital assistant, a netbook, a laptop computer, a tablet computer, a desktop computer, or any type of computing device capable of running a program and accessing a network. The client 401 with an IP address may access a server of the server cluster 430 through the DNS 402 and the load balancer cluster 420 via the communication network. In the load balancer cluster 420 and in the server cluster 430, each load balancer is configured with its own ID/IP address/name and each server is configured with its own server ID/IP address/server name. Each load balancer or each server may operate in a cloud computing service model, such as Software as a Service (SaaS), Platform as a Service (PaaS), or Infrastructure as a Service (IaaS). The load balancer cluster 420 and the server cluster 430 may also be located in a cloud computing deployment model, such as a private cloud, community cloud, public cloud, or hybrid cloud.

Still referring to FIG. 4, an existing operational flowchart of the load balancer cluster usage environment 400 is also depicted. Each load balancer (403, 404, or 405) in the load balancer cluster 420 may maintain a load balancer list (403, 404, and 405) of the load balancer cluster 420 and a server list (406, 407, and 408) of the server cluster 430 in respective configuration files. In the existing operational flowchart, three stages are included, i.e. Stage 1 for building forwarded table and forwarding a packet, Stage 2 for adding or deleting a load balancer to the load balancer cluster 420, and Stage 3 for checking status of each server in the server cluster 430.

During stage 1, as shown in FIG. 4, the client 401 sends a packet for parsing domain name of an environment comprising the clusters 420 and 430, such as WWW.example-.com, to the DNS 402 (two-way arrow 410). The DNS 402 returns a destination IP address, such as the IP address of the load balancer 403, to the client 401 by using existing domain name parser algorithm (refer to two-way arrow 410). Next, the client 401, after receiving the IP address of the load balancer 403, sends a packet by using the IP address of the client 401 as the source IP address and using the IP address of the load balancer 403 as the destination IP address to the load balancer 403 (refer to arrow 411). In response to receiving the packet, the load balancer 403 checks a local cache to determine whether there is a record comprising the IP address of the client 401 as the source IP address. In an embodiment, the record comprises information for a destination server in the server cluster for any packet from the source IP address. The information of the destination server can be represented as server ID/IP address/Server name of a server in the server cluster 430. In another embodiment, if the load balancer 403 determines that there is no such record, the load balancer 403 may first select a server, such as the server 406, from the server cluster 430 as a destination server for any packet from the IP address of the client 401. In this embodiment, the load balancer 403 may then generate such a record in which the IP address of the client 401 is the source IP address and the server 406 is the destination server for any packet from the IP address of the client 401. Afterwards, the load balancer 403 may store the generated record to its local cache and also send the generated record to the other respective load balancers in the load balancers cluster one by one, such as the load balancers 404, 405 (refer to arrow 412). Responsively, the load balancer 403 may send the packet to the server 406 based on the record (refer to arrow 413). Moreover, responsive to receiving the generated record, the other respective load balancers, such as the load balancers 404, 405, may store the record to respective local caches. Thus, all load balancers in the load balancer cluster 420 have all generated records. In an embodiment, all generated records may be managed in respective load balancers using a data structure, such as a forwarded table, XML file, and the like. Also, if the load balancer 403 determines that there is a record in which the IP address of the client 401 is the source IP address in a local cache, the load balancer 403 may send the packet to the destination server 406 indicated by the record.

Still in Stage 1 as shown in FIG. 4, once the DNS 402 obtains a next packet for parsing domain name of the environment comprising the clusters 420 and 430, the DNS 402 may return another destination IP address, such as the IP address of the load balancer 404, to the client 401 by using existing domain name parser algorithm (refer to two-way arrow 414). The client 401 may then send the next packet in which the IP address of the client 401 is the source IP address and the load balancer 404 is the destination server to the load balancer 404 (refer to arrow 415). The load balancer 404, after receiving the next packet, may check its local cache to search the record comprising the IP address of the client 401 as the source IP address. Once the load balancer 404 gets the record and finds that server 406 is the destination server in the searched record, the load balancer 404 may send the next packet to the server 406 (refer to arrow 416). In this way, all subsequent packets from the client 401 may be forwarded to the server 406 by respective load balancers.

Table 1 depicts an exemplary forwarded table, which is also referred as a table by those skilled in the art. A load balancer may check the forwarded table in its local cache to determine whether a received packet is from an existing source IP address. The column of source IP address can be used as a primary key for searching the forwarded table. The information of a destination server can be obtained from a searched record. The information of the destination server can be represented as server ID/IP address/server name of the destination server in the server cluster 430. Alternatively, the forwarded table may include a column of expired time. When the expired time of a record arrives, the record may be deleted from the forwarded table. In particular, other columns, such as number of the record being used can be added to the forwarded table if needed. It can be understood that all records can be managed by other data structure, such as XML file, txt file, and the like.

TABLE 1

| source IP address | Information of destination server | expired time |
|---|---|---|
| . . . | . . . | . . . |

The solution for managing above existing exemplary load balancer cluster usage environment 400 has some drawbacks. For example, during Stage 1, each load balancer in the load balancer cluster 420 has to send its new generated records to all other load balancers. If the load balancer cluster include many load balancers, record notification may increase communication workload for each load balancer. Moreover, each load balancer in the load balancer cluster 420 needs to maintain all generated records, such as in the forwarded table, which may be a large table. When a load balancer receives a new packet from a client, it may take much time for the load balancer to search a record in such a large table to determine a related record.

Further, during Stage 2, as shown in FIG. 4, if a load balancer, such as the load balancer 405, is added to or deleted from the load balancer cluster 420, the load balancer list in respective load balancer, originally loaded from respective configuration files when respective load balancers start up, has to be updated, which may cause each load balancer to restart to re-load the configuration file. This may affect user satisfaction for the service provided by the environment 400 as the service will be down during re-start up.

In addition, during Stage 3 as shown in FIG. 4, each load balancer in the load balancer cluster 420 checks status of each server in the server cluster 430 respectively. Status of a server includes healthy or unhealthy. In an embodiment, a server in unhealthy status can be a server in a status of CPU overload, exhausted memory, link down, service unavailable, etc. Embodiments of the present invention recognize that a server in healthy status (e.g., without significant errors or bottlenecks, etc.) can work normally (e.g., within an operating range, etc.) while a server in unhealthy status cannot work normally. Checking respective status of respective servers in the server cluster 430 is a duplicated work for each load balancer, which may increase workload of each load balancer.

Figure 5:
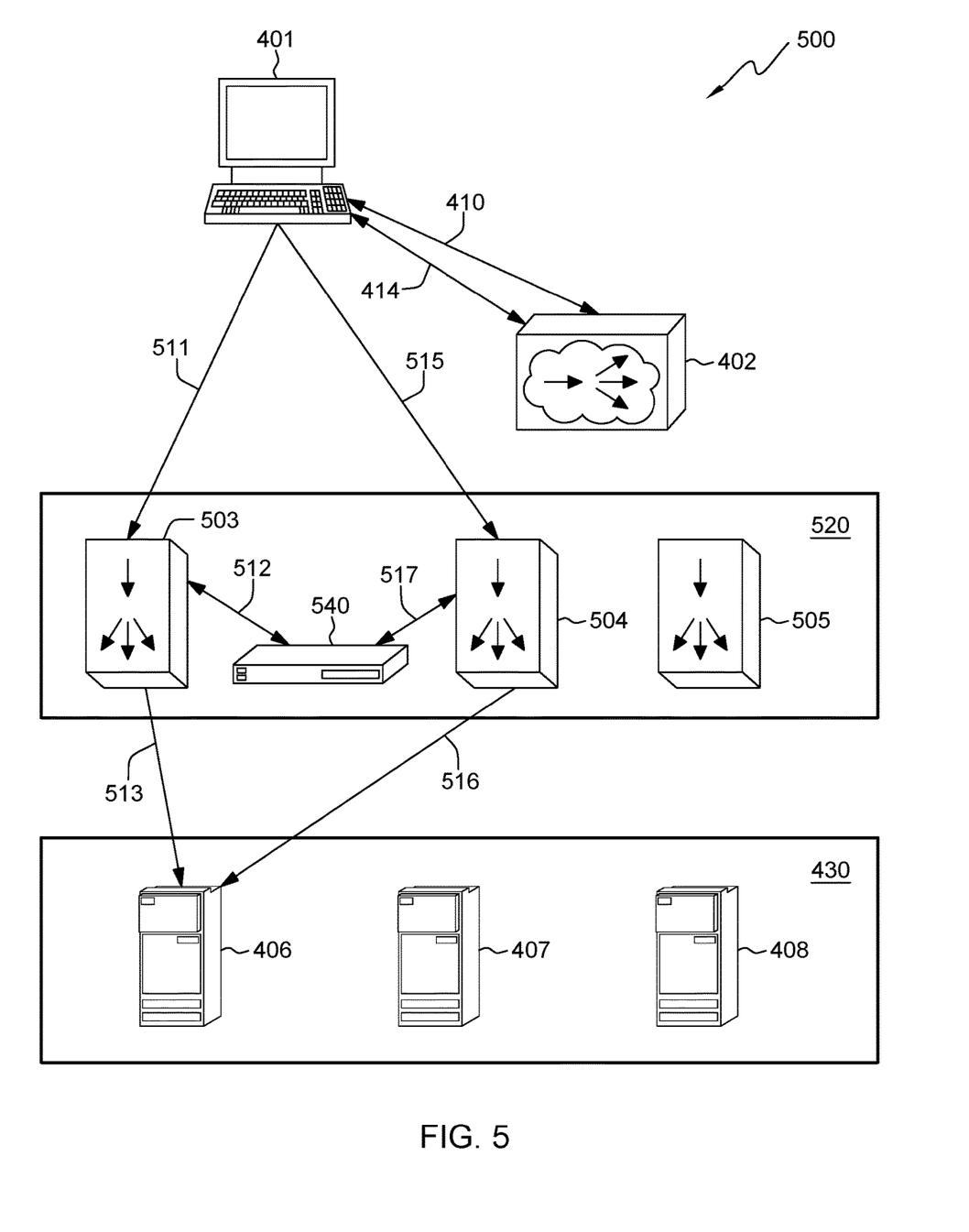
FIG. 5 depicts a proposed exemplary load balancer cluster usage environment according to an embodiment of the present invention.

Referring to FIG. 5, a proposed exemplary load balancer cluster usage environment 500 is depicted according to an embodiment of the present invention. Similar reference numerals in FIGS. 4 and 5 indicate the same modules or steps. Compared with the existing exemplary load balancer cluster usage environment 400, the new exemplary load balancer cluster usage environment 500 additionally includes an assistant 540 in the load balancer cluster 520. The assistant 540 can be a software component which may be in a standalone server in the load balancer cluster 520, or in any load balancer (503, 504 or 505) in the load balancer cluster 520. The assistant 540 maintains all generated records by each load balancer in the load balancer cluster 520 and provides record query service for all load balancers in the load balancer cluster 520 to search records (refer to arrows 512 and 517). As those skilled in the art may understand that the all generated records may be stored in the above forwarded table, or in other data structure known by those skilled in the art. In some embodiments, the assistant 540 may also maintain the load balancer list of the load balancer cluster 520 and status of each server in the server cluster 430. Each load balancer in the load balancer cluster 520 may maintain the server list of the server cluster 430, for example, each load balancer may get the server list from its configuration file during starting up.

Figure 6:
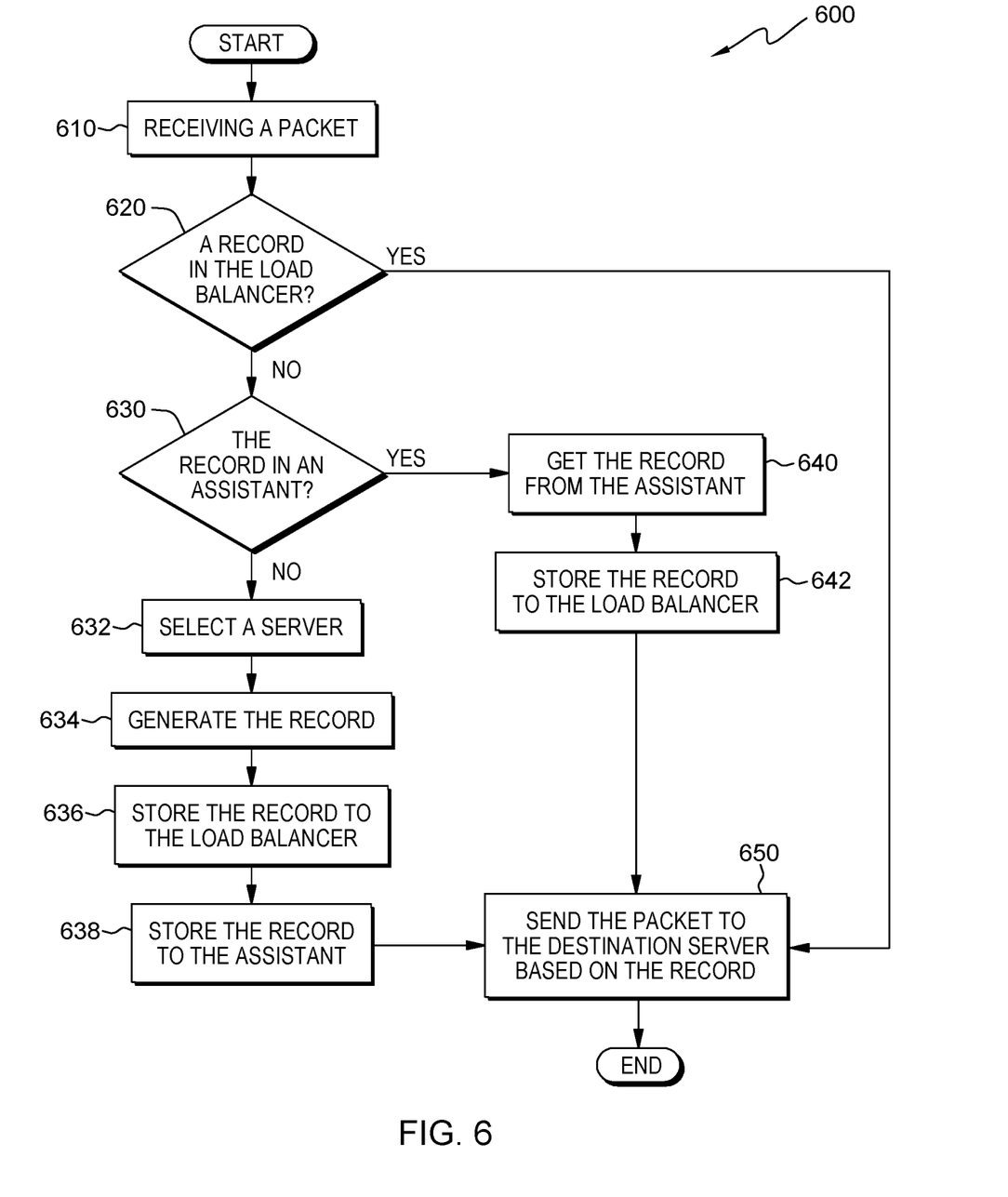
FIG. 6 depicts an operational flowchart of a load balancer in a load balancer cluster according to an embodiment of the present invention.

Referring now to FIG. 6, an operational flowchart of a first load balancer in a load balancer cluster is depicted according to some embodiments of the present invention, the load balancer cluster comprising a plurality of load balancers and an assistant. At step 610, the first load balancer in the load balancer cluster receives a first packet comprising a source IP address of the first packet. At step 620, the first load balancer determines whether there is a record comprising the source IP address of the first packet in the first load balancer, such as its own local cache, memory, or hard disk, and the like. At step 630, if the first load balancer determines there is no such record in the first load balancer, the first load balancer may further check whether there is the record in the assistant by sending a query to the assistant. Responsive to determining there is no such record in the assistant, the first load balancer selects a server from the server cluster, e.g. a first server, referred to as a destination server for any packet from the source IP address using similar selection method to the existing load balancer at step 632, generates the record in which the source IP address and information of the first server are included at step 634 where the information of the first server may be IP address of the first server, ID of the first server, or server name of the first server, and the like, stores the generated record both to the first load balancer at step 636 and to the assistant at step 638, and then send the first packet to the first server at step 650. If the first load balancer determines there is the record in the first load balancer at step 620, the first load balancer may send the first packet to the corresponding destination server indicated by the record at step 650. Embodiments of the present invention recognize that the order of steps 636, 638, and 650 can be exchanged.

For example, referring back to FIG. 5, the first load balancer is the load balancer 503, which receives a first packet comprising an IP address of a client 401 as the source IP address (arrow 511). At steps 620 and 630, the load balancer 503 determines that there is no such record comprising the IP address of the client 401 in the load balancer 503 or in the assistant 540. Next, the load balancer 503 selects server 406 as the destination server for any packet from the IP address of the client 401 at step 632, generates the record in which the IP address of the client 401 works as the source IP address and the server 406 works as the corresponding destination server at step 634, stores the record to the load balancer 503 at step 636, and sends the record to the assistant 540 for storing at step 638 (arrow 512). Then the load balancer 503 sends the first packet to the server 406 (arrow 513).

In some embodiments, the assistant may receive all records generated by all load balancers in the load balancer cluster and may maintain these records in such as above forwarded table or other data structure. The assistant may also provide record query service to all load balancers. For example, if the assistant 540 maintains these records in above forwarded table and receives a query for a record with a primary key of the IP address of the client 401 from the load balancer 503, the assistant may search the record from the forwarded table and return the record to the load balancer 503. Referring back to FIG. 6, in response to determining there is the record in the assistant at step 630, the first load balancer obtains the record from the assistant at step 640 and stores the record to the load balancer 503 at step 642, and then send the first packet to the corresponding destination server indicated by the record at step 650.

In some embodiments, for example, referring to FIG. 5, after the first load balancer 503 generates the record and sends to the assistant, a second load balancer 504 in the load balancer cluster 520 receives a second packet comprising the IP address of the client 401 as the source IP address (refer to arrow 515). The second load balancer 504 determines that there is no record comprising the IP address of the client 401 as the source IP address in the load balancer 503, the second load balancer 504 then checks whether there is the record in the assistant 540 by sending a query to the assistant (refer to arrow 517). Responsive to determining there is the record in the assistant 540, the second load balancer 504 obtains the record at step 640 (refer to arrow 517), stores the record to the load balancer 503, and then sends the second packet to the server 406 indicated by the record.

In some embodiments, for example, referring to FIG. 5, after one of the first load balancer 503 and the second load balancer 504 in the load balancer cluster 520 stores the record to respective load balancers, once one of them receives a third packet comprising the IP address of the client 401 as the source IP address, and one of them determines that there is the record in respective load balancers, one of them sends the third packet directly to the server 406 indicated by the record.

In this way, a load balancer may just notify the assistant instead of all other load balancers in the same load balancer cluster of generated records by the load balancer during Stage 1, the communication workload of each load balancer can be reduced. Aside from this, each load balancer just maintains records related to itself instead of all records in the assistant, the records related to each load balancer maybe frequently queried, so query efficiency of each load balancer can be improved. Besides, although the assistant provides record query service to all load balancers, once a record is queried by a load balancer, the record can be stored into the load balancer and will not be queried by the same load balancer again. Therefore, the query workload for the assistant is acceptable.

In various embodiments, the assistant 540 may also maintain the load balancer list of the load balancer cluster 520, for example, IDs/IP addresses/server names of the load balancers 503, 504, 505 in the load balancer cluster 520. In some embodiments, the assistant 540 may get the original load balancer list of the load balancer cluster 520 from a configuration file in the assistant. Once a load balancer, such as a load balancer 506 (which is not shown in FIG. 5), is added to the load balancer cluster 520, the load balancer 506 needs to notify the assistant 540 of the joining instead of changing the configuration file in the assistant so that the original load balancer list can be updated. In some embodiments, the assistant 540 may regular check each load balancers in the load balancer cluster 520. Once the load balancer 506 is found to be deleted from the load balancer cluster 520, the assistant 540 may delete the load balancer 506 from the load balancer list instead of changing the configuration file in the assistant. It can be found that if the load balancer 506 is added to or deleted from the load balancer cluster 520, the assistant 540 needs not to be re-started up during Stage 2.

In various embodiments, as each load balancer does not to notify other load balancers of records that it generates, each load balancer needs not maintain the load balancer list of the load balancer cluster. In some embodiments, when a load balancer starts up, the load balancer may obtain the load balancer list from the assistant. In some embodiments, when the load balancer list is updated, the load balancer may be notified by the assistant. Thus, all load balancers need not to restart if a load balancer is added to or deleted from a load balancer cluster during Stage 2.

In various embodiments, the assistant 540 may receive a status of each server (406, 407 and 408) in the server cluster 430 from a primary load balancer and maintain status of each server of the server cluster 430. In some embodiments, the primary load balancer can be assigned in the configuration file of the assistant 540.

In various embodiments, all load balancers (503, 504 and 505) in the load balancer cluster 520 can strive for the primary load balancer. For example, the assistant 540 may trigger all load balancers (503, 504 and 505) to create a lock file in the assistant 540. Once a load balancer, such as load balancers 505, successfully creates the lock file, the load balancer 505 would be assigned to be the primary load balancer by the assistant.

In various embodiments, the assistant may select a load balancer as the primary load balancer based on respective configurations of all load balancers in the load balancer cluster. For example, a load balancer with better hardware and/or software configuration can be selected as the primary load balancer. It can be understood that the assistant may select a load balancer as the primary load balancer based on other criterions. In some embodiments, the assistant may select a load balancer as the primary load balancer randomly from all load balancers in the load balancer cluster.

In various embodiments, once the primary load balancer is selected/assigned, the assistant may regular notify the primary load balancer to check a status of each server in the server cluster and send the checked status of each server to the assistant. In some embodiments, the assistant may just notify a load balancer to work as the primary load balancer, then the primary load balancer regularly checks status of each server in the server cluster in response to being notified to be the primary load balancer by the assistant and sends the checked status of each server in the server cluster to the assistant.

In various embodiments, if the assistant determines that status of a second server is changed from healthy to unhealthy, the assistant may delete stored records in which the server whose status is changed from healthy to unhealthy is the corresponding destination server (e.g. the record comprises information of the second server), and notify all load balancers in the load balancer cluster of the information of the second server whose status is changed from healthy to unhealthy. For example, if status of the server 408 is changed from healthy to unhealthy, all records comprising information of the server 408 can be deleted from the assistant. Also, the assistant may notify each load balancer in the load balancer cluster of the information of the server 408 whose status is changed from healthy to unhealthy. Each load balancer then may delete records comprising the information of the server 408 in its own load cache, and also exclude the server 408 from the load server cluster 430 so that each load balancer cannot select the server 408 as the destination server when generating a new record.

In various embodiments, if the assistant determines the status of the second server changed from unhealthy to healthy, the assistant may notify all load balancers in the load balancer cluster of the information of the second server whose status is changed from unhealthy to healthy. For example, if the status of the server 408 is changed from unhealthy to healthy, the assistant may notify each load balancer in the load balancer cluster of the information of the server 408 whose status is changed from healthy to unhealthy. Each load balancer then may include the server 408 to the load balancer cluster so that each load balancer can re-select the server 408 as the destination server when generating a new record.

It should be noted that the processing of a load balancer according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method implemented in a load balancer cluster, the load balancer cluster comprising a plurality of load balancers and an assistant, the method comprising:
   determining, by one or more computer processors, whether there is a record comprising a source internet protocol (IP) address of a received packet either in a load balancer or in the assistant; and
   responsive to determining there is no said record in the load balancer and there is the record in the assistant:
   obtaining, by the one or more computer processors, the record from the assistant, wherein the record comprises information of a first server in a server cluster and the first server being referred to as a destination server for any said received packet from the source IP address wherein obtaining the record from the assistant comprises:
      selecting, by the one or more computer processors, a server from the server cluster to be the first server;
      generating, by the one or more computer processors, the record in which the source IP address and the information of the first server are included;
      storing, by the one or more computer processors, the record to the load balancer; and
      sending, by the one or more computer processors, the packet to the first server.

2. The method of claim 1, wherein the assistant maintains records generated by the plurality of load balancers in the load balancer cluster and provides record query service to the plurality of load balancers in the load balancer cluster.

3. The method of claim 2, wherein the assistant, responsive to determining a status of a second server in the server cluster has changed from healthy to unhealthy, deletes stored records comprising information of the second server, and notifies the plurality of load balancers in the load balancer cluster of information of the second server whose status is changed from healthy status to unhealthy status, the method further comprising:
   responsive to being notified of the information of the second server whose status is changed from healthy to unhealthy by the assistant:
   deleting, by the one or more computer processors, the stored records comprising the information of the second server from the load balancer; and
   excluding, by the one or more computer processors, the second server from the server cluster.

4. The method of claim 3, wherein the assistant, responsive to determining a status of the second server is changed from unhealthy to healthy, notifies the plurality of load balancers in the load balancer cluster of the information of the second server whose status is changed from the unhealthy status to the healthy status, the method further comprising:
   including, by the one or more computer processors, the second server to the server cluster responsive to being notified of the information of the second server whose status is changed from unhealthy to healthy by the assistant.

5. The method of claim 1, further comprising:
   responsive to being notified to be a primary load balancer by the assistant,
   checking, by the one or more computer processors, a status of each said server in the server cluster; and
   sending, by the one or more computer processors, the checked status of each said server to the assistant.

6. The method of claim 1, further comprising:
   responsive to determining there is the record in the load balancer, sending, by the one or more computer processors, the packet to the first server.

7. A load balancer in a load balancer cluster, the load balancer cluster comprising a plurality of load balancers and an assistant, the load balancer comprising:
   one or more computer processors;
   one or more computer readable storage media; and
   program instructions stored on the one or more computer readable storage media for execution by at least one of the one or more processors, the stored program instructions comprising:
      program instructions to determine whether there is a record comprising a source internet protocol (IP) address of a received packet either in the load balancer or in the assistant; and
      responsive to determining there is no said record in the load balancer and there is the record in the assistant:
      program instructions to obtain the record from the assistant, wherein the record comprises information of a first server in a server cluster and the first server being referred to as a destination server for any said received packet from the source IP address, wherein the program instructions to obtain the record from the assistant, comprise:
         program instructions to select a server from the server cluster to be the first server;
         program instructions to generate the record in which the source IP address and the information of the first server are included;
         program instructions to store the record to the load balancer; and
         program instructions to send the packet to the first server.

8. The load balancer of claim 7, wherein the assistant maintains records generated by the plurality of load balancers in the load balancer cluster and provides record query service to the plurality of load balancers in the load balancer cluster.

9. The load balancer of claim 7, wherein the program instructions, stored on the one or more computer readable storage media, comprise:
   responsive to being notified to be a primary load balancer by the assistant,
   checking a status of each said server in the server cluster; and
   sending the checked status of each said server to the assistant.

10. The load balancer of claim 9, wherein the assistant, responsive to determining a status of a second server in the server cluster is changed from healthy to unhealthy, deletes stored records comprising information of the second server, and notifies the all load balancers in the load balancer cluster of the information of the second server whose status is changed from healthy to unhealthy, wherein the program instructions, stored on the one or more computer readable storage media, comprise:
   responsive to being notified of the information of the second server whose status is changed from healthy to unhealthy by the assistant:

deleting the stored records comprising the information of the second server from the load balancer; and excluding the second server from the server cluster.

11. The load balancer of claim 10, wherein the assistant, responsive to determining that the status of the second server is changed from unhealthy to healthy, notifies the plurality of load balancers in the load balancer cluster of the information of the second server whose status is changed from unhealthy to healthy, wherein the program instructions, stored on the one or more computer readable storage media, comprise:

including the second server to the server cluster in response to being notified of the information of the second server whose status is changed from unhealthy to healthy by the assistant.

12. A computer program product, comprising a computer readable storage medium having program instructions stored on one or more computer readable storage media, the stored program instructions executable by a load balancer in a load balancer cluster which comprises a plurality of load balancers and an assistant, the stored program instructions comprising:

program instructions to determine whether there is a record comprising a source internet protocol (IP) address of a received packet either in the load balancer or in the assistant; and responsive to determining there is no said record in the load balancer and there is the record in the assistant:

program instructions to obtain the record from the assistant, wherein the record comprises information of a first server in a server cluster and the first server being referred to as a destination server for any said received packet from the source IP address, wherein the program instructions to obtain the record from the assistant, comprise:

program instructions to select a server from the server cluster to be the first server;

program instructions to generate the record in which the source IP address and the information of the first server are included;

program instructions to store the record to the load balancer; and program instructions to send the packet to the first server.

13. The computer program product of claim 12, wherein the assistant maintains records generated by the all load balancers in the load balancer cluster and provides record query service to the plurality of load balancers in the load balancer cluster.

14. The computer program product of claim 12, wherein the program instructions stored, on the one or more computer readable storage media, comprise:

program instructions to responsive to being notified to be a primary load balancer by the assistant, program instructions to check a status of each said server in the server cluster; and program instructions to send the checked status of each said server to the assistant.

15. The computer program product of claim 14, wherein the assistant, responsive to determining a status of a second server in the server cluster is changed from healthy to unhealthy, deletes stored records comprising information of the second server, and notifies the plurality of load balancers in the load balancer cluster of the information of the second server whose status is changed from healthy to unhealthy, wherein the program instructions, stored on the one or more computer readable storage media, comprise:

responsive being notified of the information of the second server whose status is changed from healthy to unhealthy by the assistant:

program instructions to delete the stored records comprising the information of the second server from the load balancer; and program instructions to exclude the second server from the server cluster.

16. The computer program product of claim 15, wherein the assistant, responsive to determining that the status of the second server is changed from unhealthy to healthy, notifies the plurality of load balancers in the load balancer cluster of the information of the second server whose status is changed from unhealthy to healthy, wherein the program instructions, stored on the one or more computer readable storage media, comprise:

program instructions to include the second server to the server cluster in response to being notified of the information of the second server whose status is changed from unhealthy to healthy by the assistant.

* * * * *